(12) United States Patent
Hagel (10) Patent No.: US 11,396,975 B2
(45) Date of Patent: *Jul. 26, 2022

(54) REMOVABLE OR ADJUSTABLE COVER FOR GARAGE DOOR SENSOR

(71) Applicant: Rick Hagel, Buna, TX (US)

(72) Inventor: Rick Hagel, Buna, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/382,690

(22) Filed: Jul. 22, 2021

(65) Prior Publication Data

US 2021/0348715 A1   Nov. 11, 2021

Related U.S. Application Data

(63) Continuation-in-part of application No. 16/922,307, filed on Jul. 7, 2020, now Pat. No. 11,125,004.

(60) Provisional application No. 62/871,317, filed on Jul. 8, 2019.

(51) Int. Cl.
| | |
|---|---|
| *E05F 11/00* | (2006.01) |
| *F16M 13/02* | (2006.01) |
| *E05F 15/40* | (2015.01) |
| *G01V 8/20* | (2006.01) |
| *E05F 15/73* | (2015.01) |

(52) U.S. Cl.
CPC ........... *F16M 13/022* (2013.01); *E05F 15/40* (2015.01); *G01V 8/20* (2013.01); *E05F 15/73* (2015.01); *E05F 2015/765* (2015.01); *E05Y 2400/44* (2013.01); *E05Y 2400/532* (2013.01); *E05Y 2900/106* (2013.01)

(58) Field of Classification Search
CPC ............. E05F 15/43; E05F 2015/434; E05Y 2900/106; E05Y 2600/45; E05Y 2201/11; E05Y 2400/44

USPC .................................................. 49/197, 199
See application file for complete search history.

(56) References Cited

U.S. PATENT DOCUMENTS

| | | | |
|---|---|---|---|
| 4,363,459 A | 12/1982 | Holzer | |
| 5,381,308 A | 1/1995 | Wolpert et al. | |
| 5,428,923 A | 7/1995 | Waggamon | |
| 5,508,511 A | 4/1996 | Zur et al. | |
| 5,529,273 A * | 6/1996 | Benthin | A47H 1/142 248/254 |
| 5,739,753 A | 4/1998 | Porter | |
| 5,934,019 A * | 8/1999 | Rotharmel | E05F 15/43 49/28 |
| 5,937,578 A * | 8/1999 | Dolan | E05F 15/43 49/26 |
| 6,020,703 A | 2/2000 | Telmet | |

(Continued)

OTHER PUBLICATIONS

WikiHow, How to Shut a Garage Door when the Sun Is Shining on the Electronic Eyes, https://www.wikihow.com/Shut-a-Garage-Door-when-the-Sun-Is-Shining-on-the-Electronic-Eyes, Apr. 24, 2019.

(Continued)

*Primary Examiner* — Jerry E Redman
(74) *Attorney, Agent, or Firm* — Standley Law Group LLP; F. Michael Speed, Jr.; Adam J. Smith (57) ABSTRACT

A sensor unit includes a garage door sensor, a frame configured to be secured at one side of an opening for a garage door, and a cover. The garage door sensor is connected to said frame. The cover is configured to accommodate at least a portion of said garage door sensor. The cover is removably secured to said garage door sensor, such as for periodic cleaning.

16 Claims, 11 Drawing Sheets

(56) References Cited

U.S. PATENT DOCUMENTS

| | | | |
|---|---|---|---|
| 6,082,046 | A | 7/2000 | Simmons |
| 6,157,023 | A * | 12/2000 | Wenner ............... H01L 31/0203 |
| | | | 250/221 |
| 6,509,561 | B1 * | 1/2003 | Scott ..................... G01V 8/12 |
| | | | 250/239 |
| 6,529,129 | B1 | 3/2003 | Tomooka |
| 6,662,499 | B1 * | 12/2003 | Shin ..................... F16M 13/02 |
| | | | 248/298.1 |
| 7,045,764 | B2 | 5/2006 | Beggs et al. |
| 7,178,289 | B2 | 2/2007 | Gierl et al. |
| D608,805 | S * | 1/2010 | Gantner ..................... D15/199 |
| D886,655 | S * | 6/2020 | Machijima .................. D10/103 |
| 11,125,004 | B2 * | 9/2021 | Hagel ..................... E05F 15/43 |
| 2001/0013762 | A1 | 8/2001 | Roman |
| 2002/0105430 | A1 | 8/2002 | Williams et al. |
| 2006/0196119 | A1 | 9/2006 | Hermann |
| 2010/0307058 | A1 * | 12/2010 | Sanke ..................... E05F 15/43 |
| | | | 49/31 |
| 2011/0023364 | A1 * | 2/2011 | Euteneuer ............... E05F 15/43 |
| | | | 49/25 |
| 2011/0173890 | A1 | 7/2011 | Gantner |
| 2011/0196516 | A1 | 8/2011 | Yang et al. |
| 2012/0092125 | A1 | 4/2012 | Farber et al. |
| 2018/0363358 | A1 | 12/2018 | Hudson et al. |
| 2019/0024437 | A1 | 1/2019 | Tagtow et al. |
| 2019/0257130 | A1 | 8/2019 | Walser |
| 2019/0383090 | A1 | 12/2019 | Lee et al. |
| 2020/0024882 | A1 | 1/2020 | Emrich |
| 2020/0291714 | A1 | 9/2020 | Baer et al. |
| 2020/0325717 | A1 | 10/2020 | Didio |
| 2021/0010312 | A1 | 1/2021 | Hagel |

OTHER PUBLICATIONS

Chamberlain, Liftmaster—Genie—Craftsman—Universal FIT Garage Door Safety Sensor SunVisor Eye-Aye, https://www.amazon.com/Chamberlain-LIFTMASTER-Craftsman-Universal-SunVisor/dp/B0722N3MDJ, Apr. 24, 2019.

Garage Door Pros, Is The Sun Interfering With Your Garage Door Sensor?, https://www.madisongaragerepair.com/blog/garage-door-sensors-and-sunlight/, Apr. 24, 2019.

Perkins, Jim, Simple fix to allow the garage door to function as the sun sets, https://www.youtube.com/watch?v=QrPMbvVhq4E, Mar. 10, 2015, 1 page.

* cited by examiner

REMOVABLE OR ADJUSTABLE COVER FOR GARAGE DOOR SENSOR

CROSS-REFERENCE TO RELATED APPLICATIONS

This application is a continuation-in-part of U.S. application Ser. No. 16/922,307 filed Jul. 7, 2020, now U.S. Pat. No. 11,125,004, which claims the benefit of U.S. provisional patent application No. 62/871,317 filed Jul. 8, 2019, the disclosures of each of which are hereby incorporated by reference as if fully restated.

TECHNICAL FIELD

Exemplary embodiments relate generally to a removable or adjustable cover for a garage door sensor.

BACKGROUND AND SUMMARY OF THE INVENTION

Garage door sensors are common fixtures in the modern home and are sometimes required by law. Such sensor systems generally comprise a pair of photo eyes located on opposite sides of an opening to a garage. One or both sensors transmit a signal which is received by the opposing sensor. Interruption of this signal, such as by breaking the line of sight between the sensors, may cause garage door operation to be interrupted or prevented. Generally, interruption of the beam while the garage is being closed causes the garage door to reverse directions and begin opening. Generally speaking, the objective behind such sensor systems is to prevent the garage door from closing on a person or object.

These sensors, particularly where they comprise photo eyes, may be affected by ambient lighting. For example, during sunrise and sunset hours, ambient light may strike one or both of the sensors, causing them to malfunction. It is known to place covers over one or both sensors to limit the ability for ambient light to strike one or both sensors. However, such covers generally require customization and are difficult to make and install. Furthermore, such covers are generally non-adjustable. Further still, these covers sometimes become broken or otherwise in need of repair and replacement. As another example, these covers sometimes become covered with debris such as leaves, dust, twigs, cobwebs, insects, and the like, which may result in malfunction of the sensors. Therefore, what is needed is a removable or adjustable cover for a garage door sensor.

A removable or adjustable cover for a garage door sensor is provided. The cover may comprise a square or rectangular shape cover which is configured for sliding movement with respect to the sensor. The cover may comprise a slot which permits removal and/or adjustment with respect to the distance the cover extends from a distal end of the sensor. A receiving portion may be provided on a top surface of the sensor and may be configured to receive a fastener. The receiving portion may comprise an aperture, notch, protrusion, indentation, shelf, some combination thereof, or the like. A proximal end of the fastener may be received within the receiving portion, pass through an aperture in a mounting frame, and through the slot. A nut may be secured to a distal end of the fastener protruding from the aperture to secure the cover to the frame. In this way, the sensor may be secured to the frame by a press-fit, mechanical compression, friction, some combination thereof, or the like.

Various types of garage door sensors may be constructed differently and therefore necessitate different cover embodiments. In exemplary embodiments, the removeable cover may comprise a hollow, cylindrical shape. The cover may be configured to fit within a recess between a protrusion formed in a housing of said garage door sensor for a photo eye of the garage door sensor and the photo eye. The cover may comprise a sidewall thickness configured to provide a friction fit between the protrusion and the photo eye to removably secure said cover within a gap defined, at least in part, by an inner surface of said protrusion and an outer surface of said photo eye. The protrusion may comprise a hollow cylindrical shape. The photo eye may comprise a generally cylindrical shape. The garage door sensor may be mounted to a frame configured for selective attachment to a wall, track for a garage door, combinations thereof, or the like.

In other exemplary embodiment, the cover may comprise a hollow cylindrical shape with a rear surface located at a distal end thereof. The rear surface may comprise an aperture configured for placement between a rear surface of said photo eye and/or a rear surface of the protrusion and a front surface of said frame and/or a front surface of the housing for the garage door sensor. In this manner, the cover may be secured frictionally within a gap between the rear surface of the protrusion and/or a rear surface of the photo eye and a front surface of said frame and/or a front surface of the housing for the garage door sensor.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

FIG. 1 through FIG. 4 and FIG. 8 illustrate various views of the garage door sensor 50 and cover 30. The garage door sensor 50 may be mounted to a frame 10. At least the garage door sensor 50 and cover 30 may collectively form an adjustable sensor unit 1. The adjustable sensor unit 1 may include the frame 10, though such is not necessarily required. The adjustable sensor unit 1 may include various components of the garage door sensor 50, cover 30, and frame 10. The frame 10 may comprise a first portion 14 configured to secure the sensor 50 a vertical and/or horizontal distance from a floor and/or a wall of the garage. Alternatively, or additionally, the frame 10 may comprise a second portion 18 configured to secure the sensor 50 a vertical and/or horizontal distance from a track 3 or other frame member 13 for the garage door 15 or a wall 11. The first portion 14 may extend substantially perpendicular to the second portion 18. The second portion 18 may extend from a distal end of the first portion 14. The frame 10 may form a substantially "L" shape, though any shape is contemplated.

The frame 10 may comprise a clip 19 for attachment to the track 3 or other component of the garage door assembly 9, though such is not required. Any size, shape, or kind of frame 10 is contemplated. The frame 10 may be configured to secure the sensor 50 in position, preferably aligned with a second sensor 50, a reflector plate 7, or the like. In exemplary embodiments, at least one sensor 50 may be installed on either side of an opening 5 for a garage door 15. In other exemplary embodiments, a single sensor 50 may be positioned on one side of an opening 5 for a garage door 15 and a reflector plate 7 may be located on the opposing side of the opening 5.

Some or all of the cover 30 may be shaped as a hollow cube, cuboid, and/or cylindrical shape, though any size or shape is contemplated. The cover 30 may be comprised of a rigid polymer, though any material is contemplated. In exemplary embodiments, the cover 30 may be the same shape as the sensor 50. The hollow portion of the cover 30 may be configured to fit over some or all of the sensor 50. Sufficient clearance may be provided between the cover 30 and the sensor 50 to permit axial adjustment of the cover 30 relative to the sensor 50.

The cover 30 may be configured for movement relative to the sensor 50. Alternatively, or additionally, the cover 30 may be configured for movement relative to the frame 10. In this way, the distance the cover 30 extends from the sensor 50 may be adjusted. This may permit control of the amount of ambient light allowed to contact the sensor 50, as well as clearance for passing vehicles, some combination thereof, and the like. The cover 30 may comprise a slot 32. The slot 32 may extend along some or all of the cover 30 to facilitate movement of the cover 30. The slot 32 may comprise one or more protrusions or the like configured to selectively and temporarily secure the cover 30 at any one or a number of positions.

The cover 30 may be configured for selective removal such as for replacement, repair, some combination thereof, or the like. In exemplary embodiments, the slot 32 may extend along an upper surface of the cover 30 to an outer edge of the cover 30 so as to facilitate removal of the cover 30 from the sensor 50 and/or the frame 10.

The frame 10 may comprise an aperture 12. In exemplary embodiments, the aperture 12 is located in the second portion 18 of the frame 10, though any location on the frame 10 is contemplated. The aperture 12 may be configured to receive a fastener 40. A receiving portion 52 located in the sensor 50 may be configured to accommodate at least a portion of the fastener 40. The receiving portion 52 may comprise an aperture, notch, protrusion, indentation, shelf, hole, threaded hole, some combination thereof, or the like.

The receiving portion 52 may be configured to receive a first end of the fastener 40. The first end of the fastener 40 may comprise a head portion and a threaded portion, though any type of fastener 40 is contemplated. The fastener 40 may comprise a threaded portion configured to receive a nut 42. The threaded portion may be located at a second end of the fastener 40. In exemplary embodiments, the nut 42 is a wing-nut, though any type of nut is contemplated. One or more washers 44 may be used between the nut 42 and various components such as the frame 10, the sensor 50, and/or the cover 30. The fastener 40 may be sized to be temporarily secured within the receiving portion 52, extend therefrom through the slot 32, through the aperture 12, and extend from the frame 10 sufficient distance to receive the nut 42. Tightening the nut 42 may cause pressure to be exerted between the sensor 50 and the frame 10 such that the cover 30 is trapped therebetween. In this way, the position of the cover 30 may be temporarily fixed relative to the sensor 50 such that the distance the cover 30 extends from the sensor 50 may be adjusted.

The nut 42 may be loosed to permit adjustment and/or removal of the cover 30. In this way, the amount of ambient light permitted to hit the sensor 50 may be adjusted. For example, it may be desirable to adjust the cover 30 based on the time of day, time of year, season, location of the garage, for vehicle clearance, some combination thereof, or the like. In this way, the cover 30 may also be removed for replacement, cleaning, repair, some combination thereof, or the like. In particular, the cover 30 may be removed to clean out debris and the like, which may affect the performance of the sensor 50.

While the fastener 40 and nut 42 are described herein, those of skill in the art will recognize that alternative configurations for securing the cover 30 to the frame 10 are contemplated. For example, without limitation, a protrusion may be used in substitution for the fastener 40 and a clamp may be used in substitution for the nut 42. As another example, without limitation, a protrusion may be used in substitution for the fastener 40 and a pin may be used in substitution for the nut 42.

Figure 1:
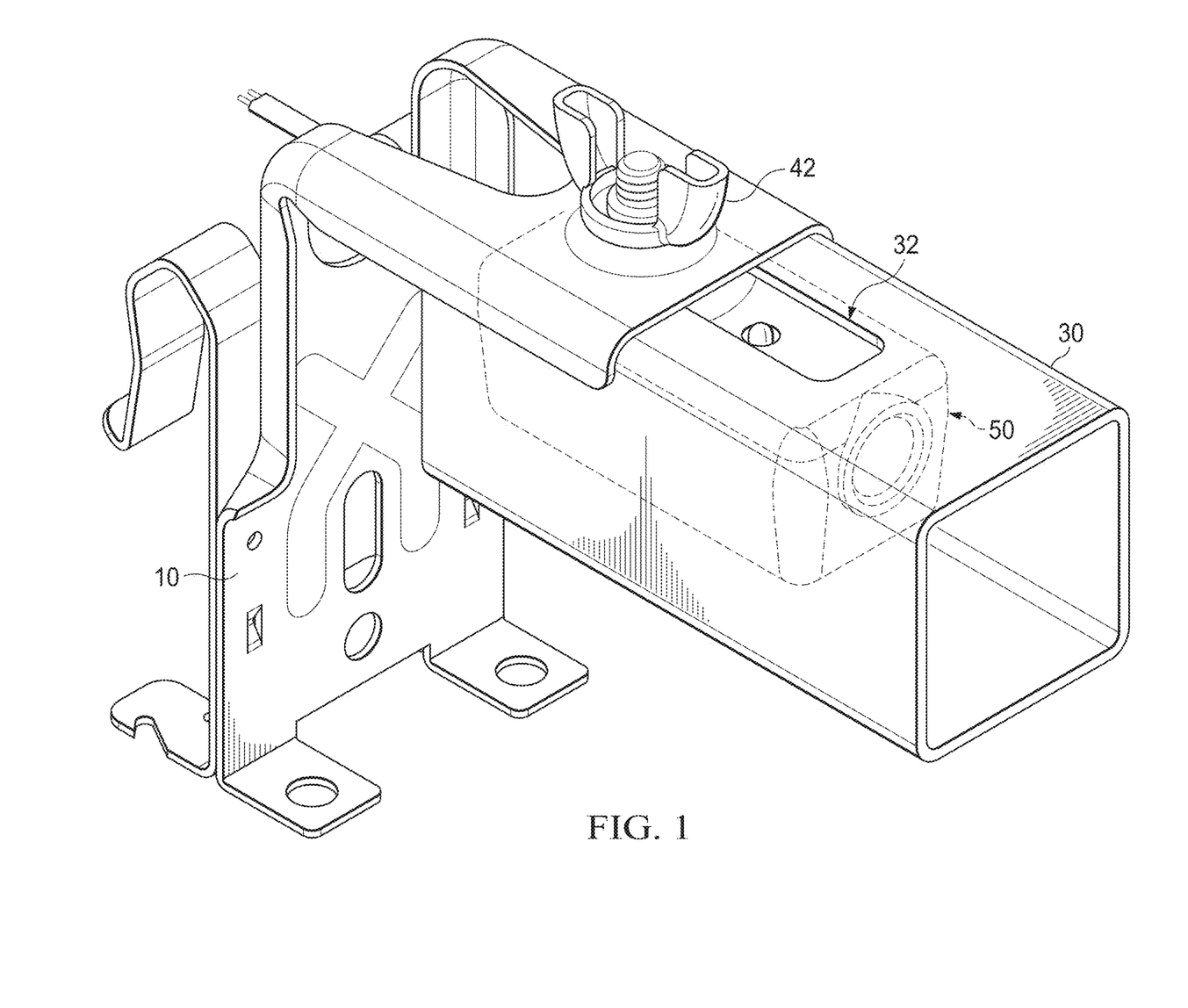
FIG. 1 is perspective view of an exemplary garage door sensor and cover.
Figure 2:
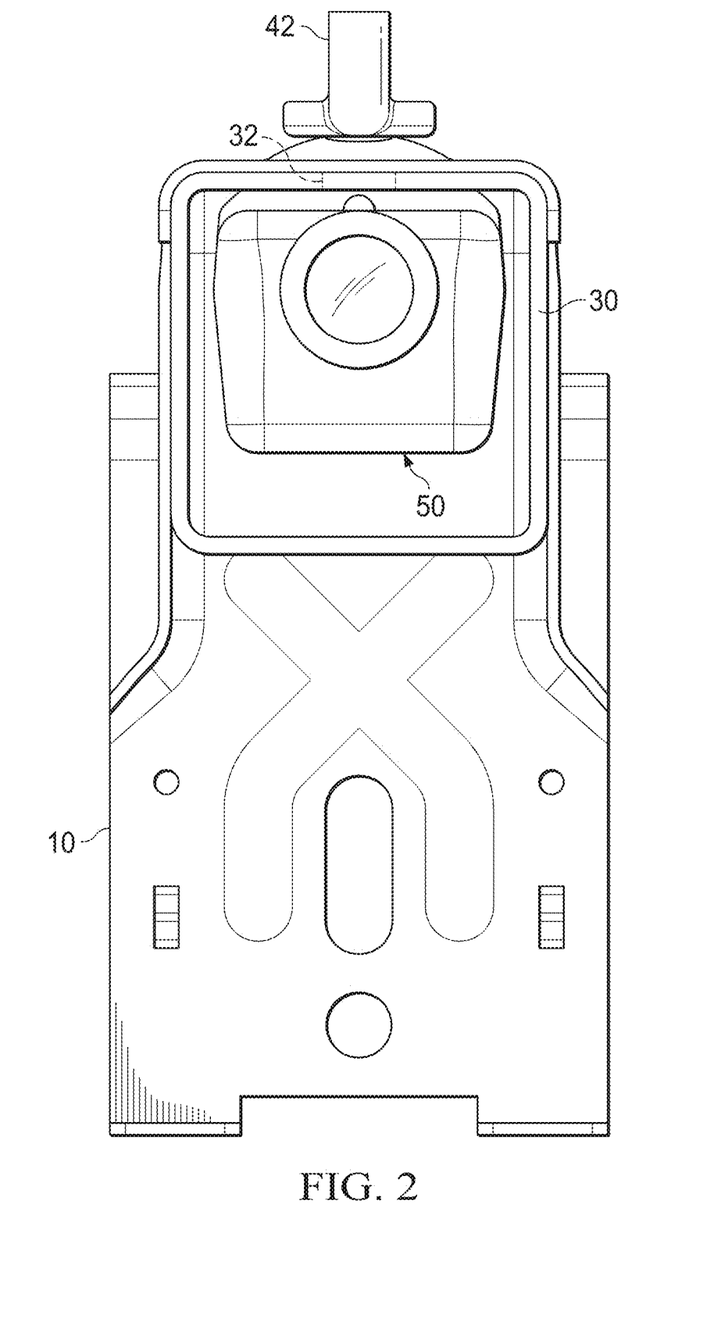
FIG. 2 is a front view of the garage door sensor and cover of FIG. 1.
Figure 3:
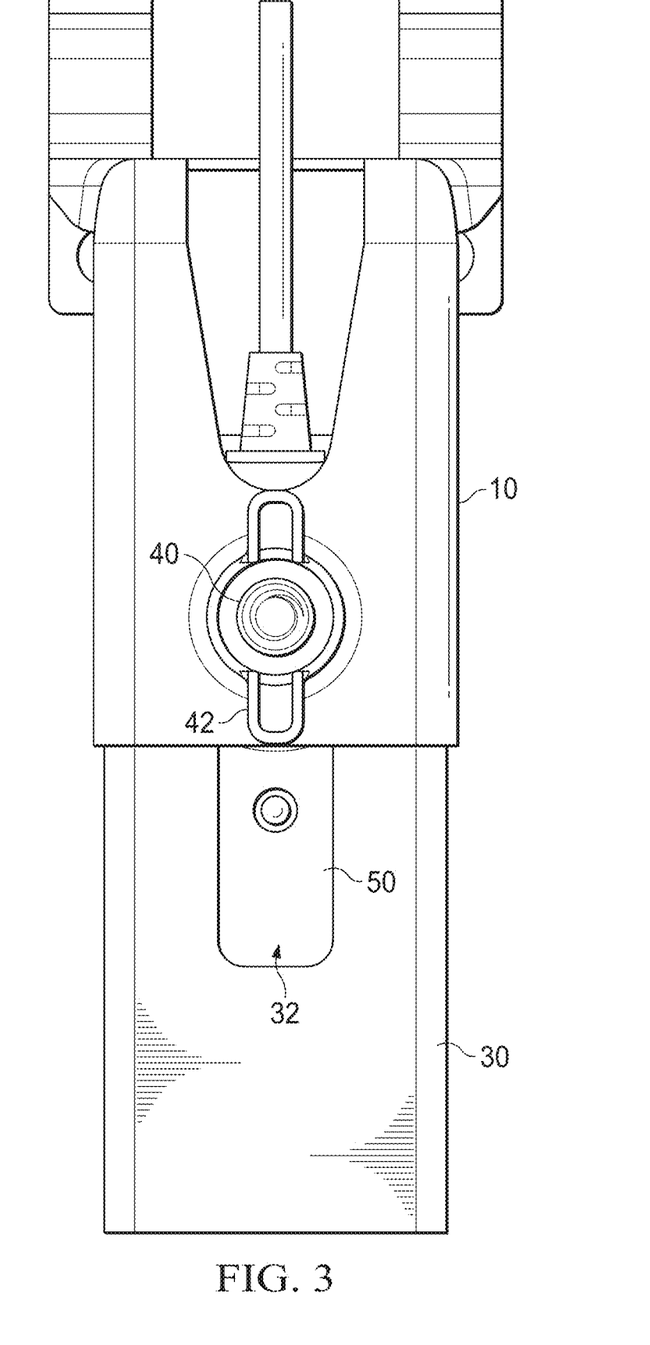
FIG. 3 is a top view of the garage door sensor and cover of FIG. 1.
Figure 4:
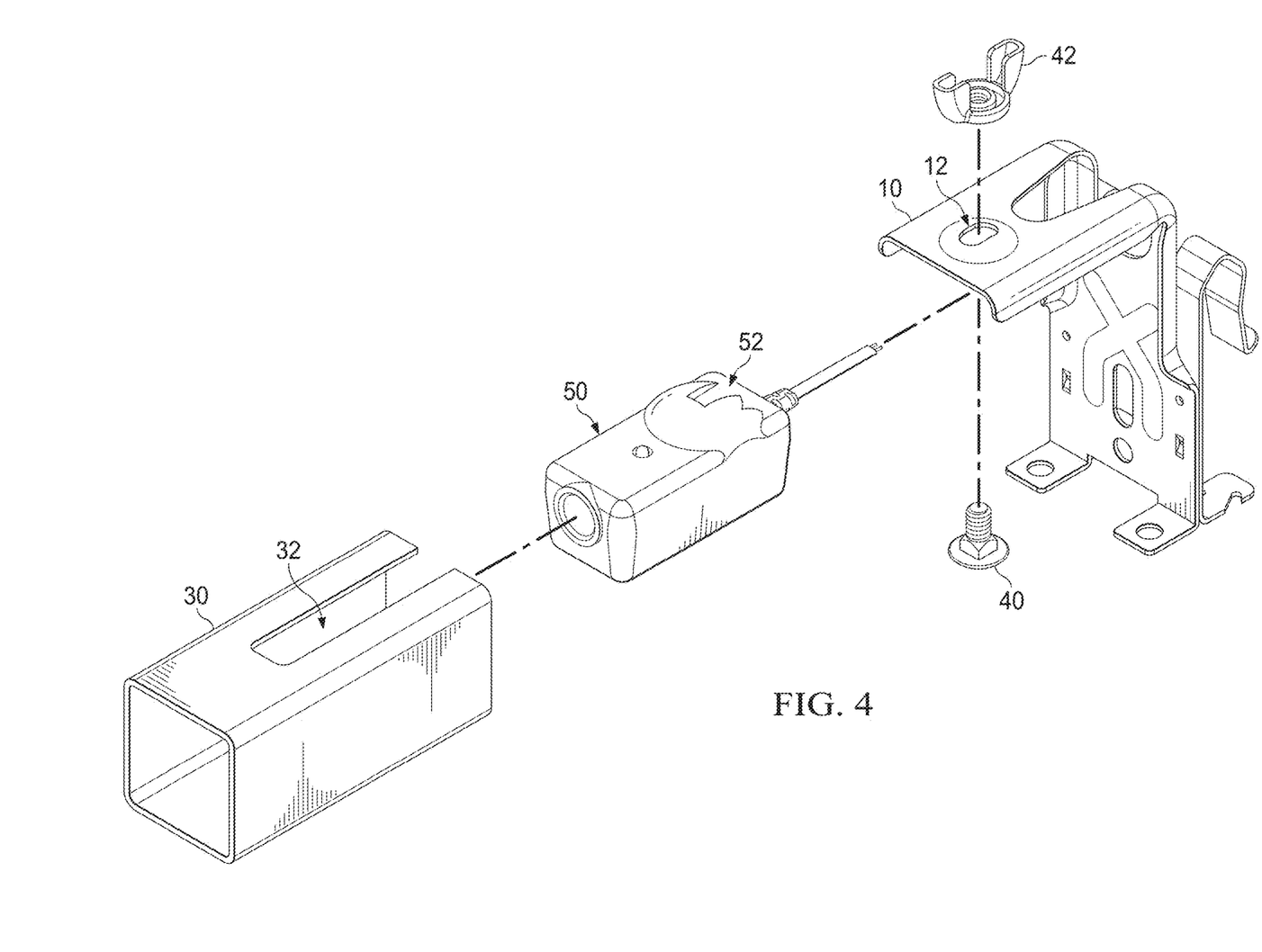
FIG. 4 is a top perspective view of the garage door sensor and cover of FIG. 1 in a disassembled state.
Figure 5:
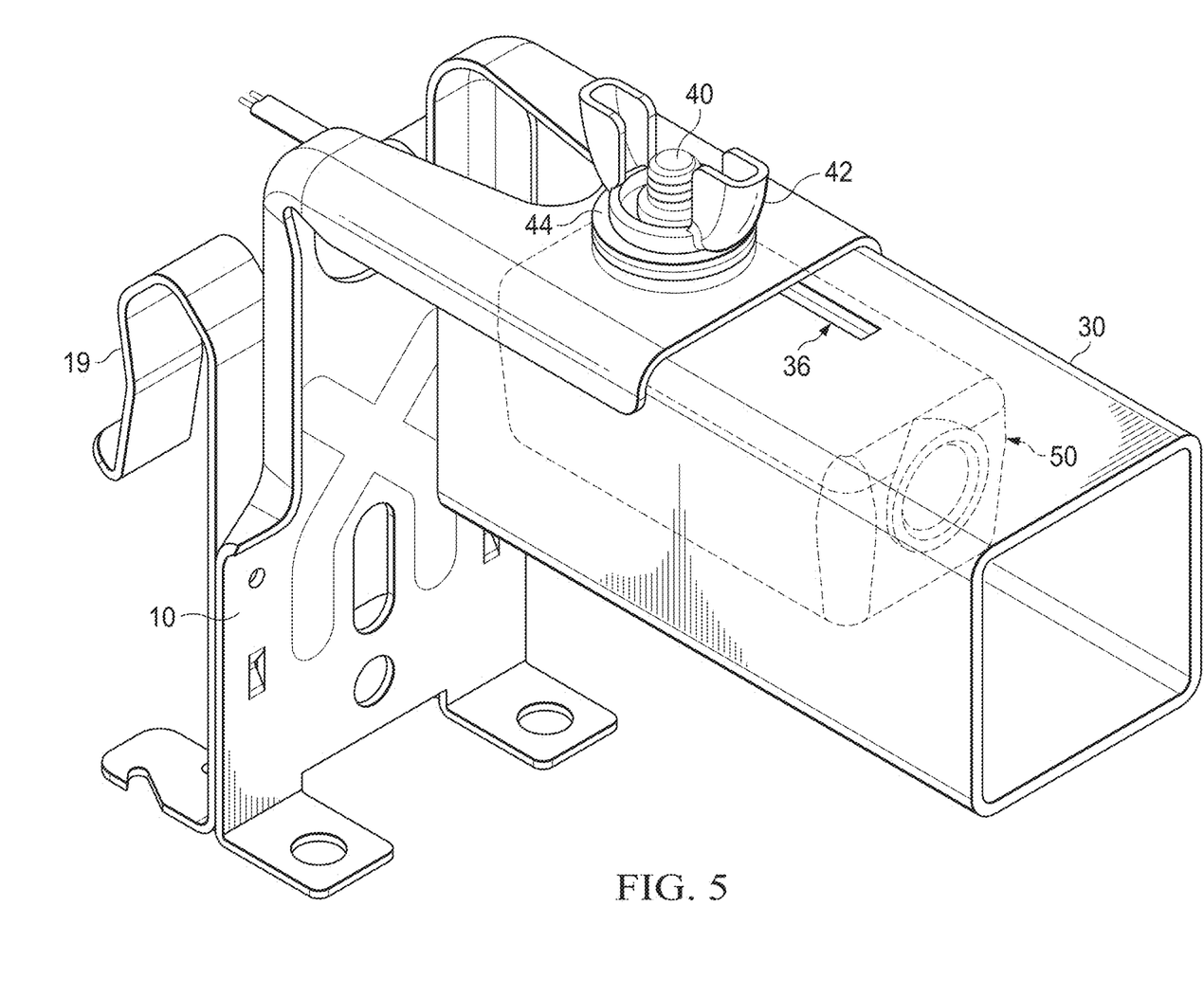
FIG. 5 is a side perspective view of the garage door sensor with another exemplary cover.
Figure 6:
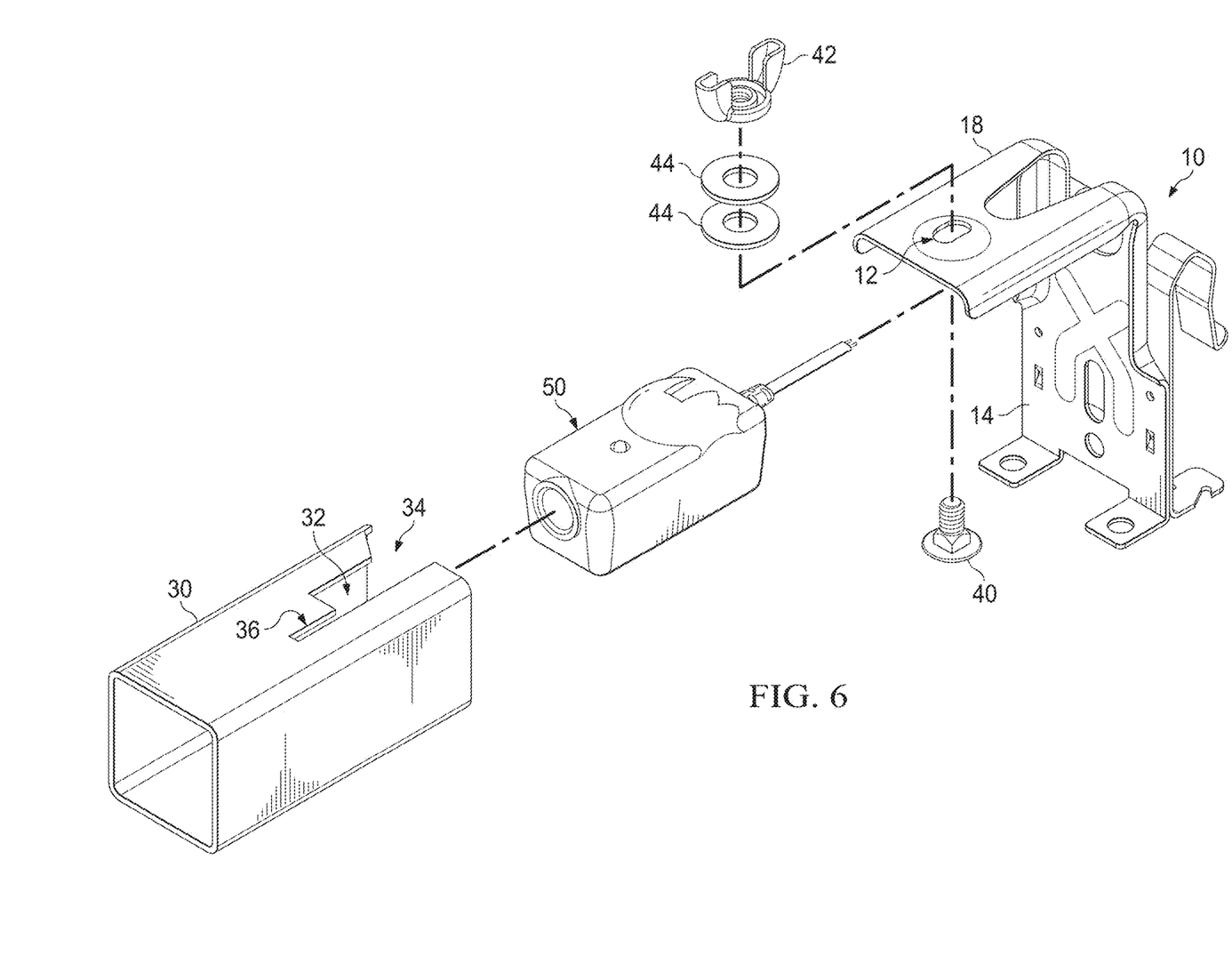
FIG. 6 is a top view of the garage door sensor and cover of FIG. 5 in a disassembled state.

FIG. 5 and FIG. 6 illustrate the garage door sensor 50 with another exemplary cover 30. The frame 10, sensor 50, fastener 40, and nut 42, and various components and features thereof, may be the same or similar to those shown and described with respect to FIGS. 1-4. The cover 30 may comprise the slot 32. The slot 32 may comprise a rear notch 34. The rear notch 34 may be located on a proximal end of the slot 32. The rear notch 34 may be located at an outer edge of the cover 30. The rear notch 34 may comprise an enlarged area which may facilitate ease of removal of the cover 30. The slot 32 may further comprise a front notch 36. The front notch 36 may extend from a distal end of the slot 32. The front notch 36 may comprise a narrowed area which may facilitate additional flexibility in the cover 30 to permit ease of fitting over the sensor 50. The front notch 36 may be sufficiently narrow to prevent the fastener 40 from passing within or through the front notch 36. Although two standard washers 44 are shown, it is contemplated that any type, size, number, of kind of washer 44 such as but not limited to, lock washer, split washers, grommets, and the like are contemplated in addition to, or instead of, the illustrated washers 44.

Figure 7:
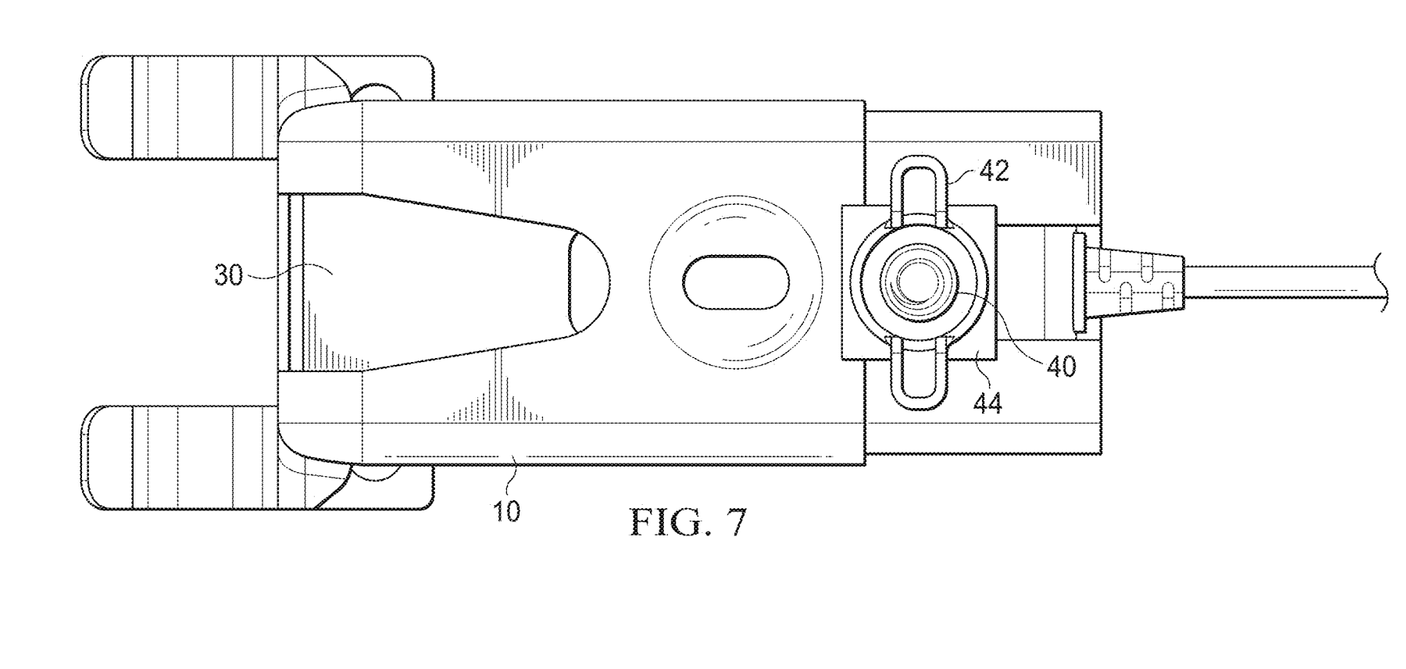
FIG. 7 is a top view of the garage door sensor with another exemplary cover.
Figure 8:
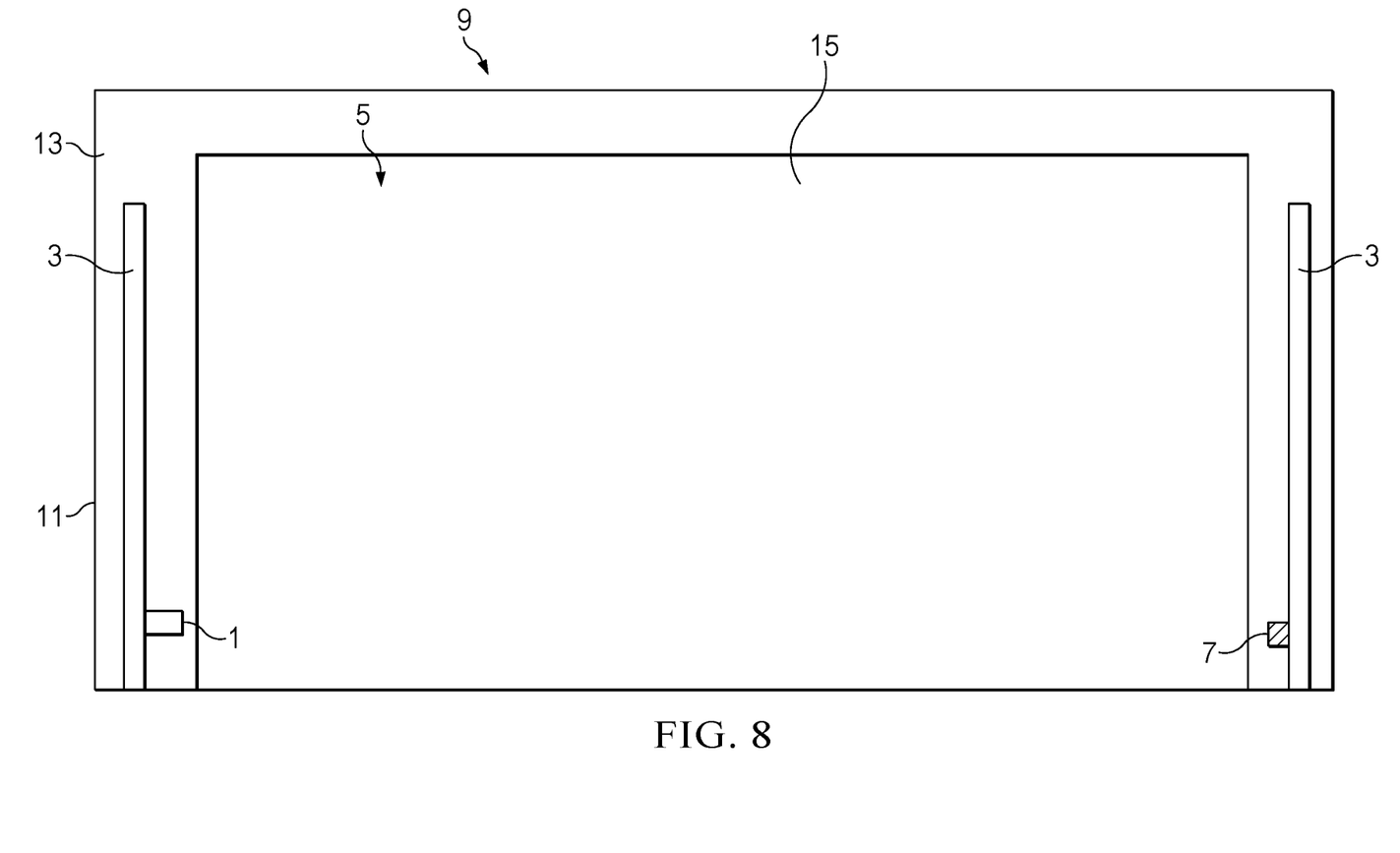
FIG. 8 is a rear view of an exemplary garage door in a closed position from within a garage with an exemplary adjustable sensor unit installed.

FIG. 7 is a top view of the garage door sensor 50 and another exemplar cover 30. One or more of the washers 44 may be shaped as a square, rectangular, or other shape plate. Such a square, rectangular, or other shape plate may be used in place of, or in addition to, traditional, round shaped washers 44. The plate 44 may comprise an aperture configured to accommodate the fastener 40 but not permit the nut 42 to pass therethrough. It is also contemplated that the sensor 50 may be oriented such that the photo-eye portion faces towards the first portion 14 of the frame 10.

Any type, size, shape, or other configuration of the frame 10 and/or the sensor 50 are contemplated. Each sensor 50 may comprise one or more photo-eyes, through other types of sensors 50 such as, but not limited to, ultrasonic, laser, cameras, some combination thereof, or the like are contemplated.

Figure 9:
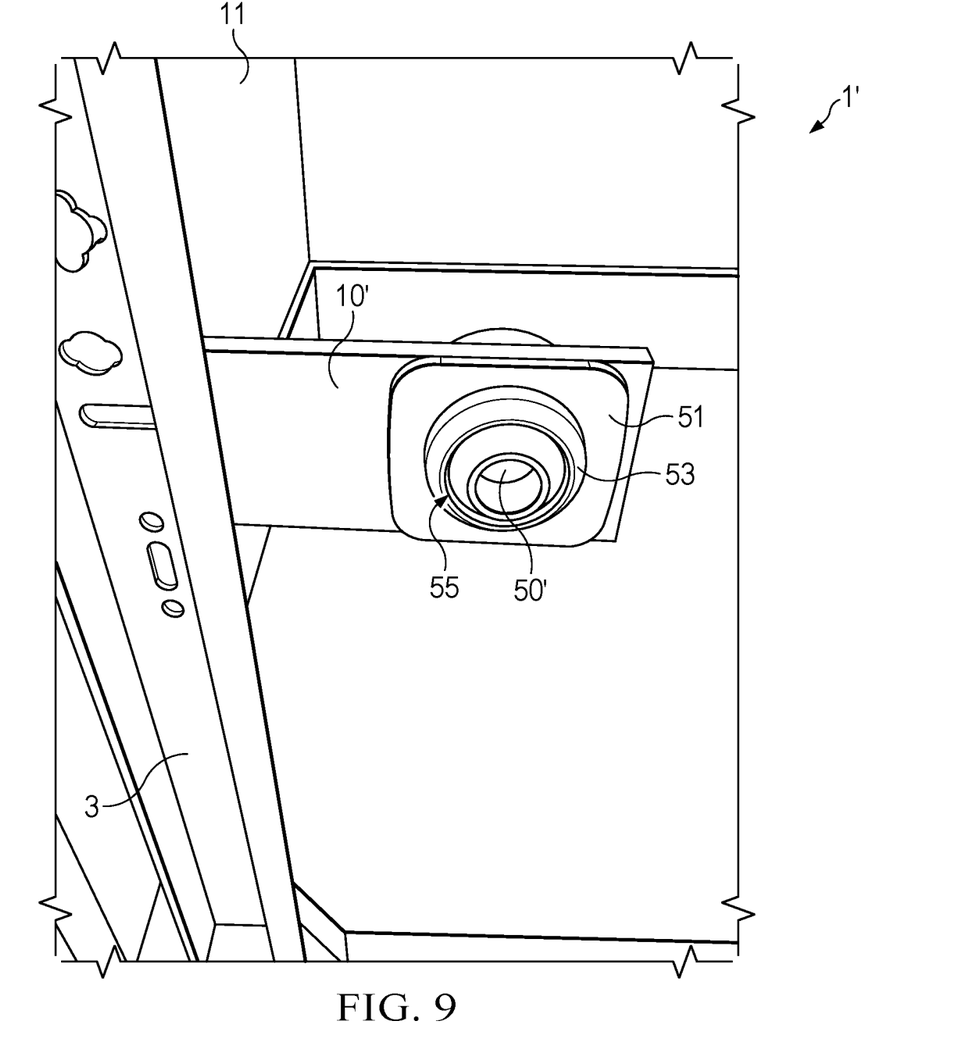
FIG. 9 is a front perspective view of another exemplary garage door sensor without a cover.
Figure 10:
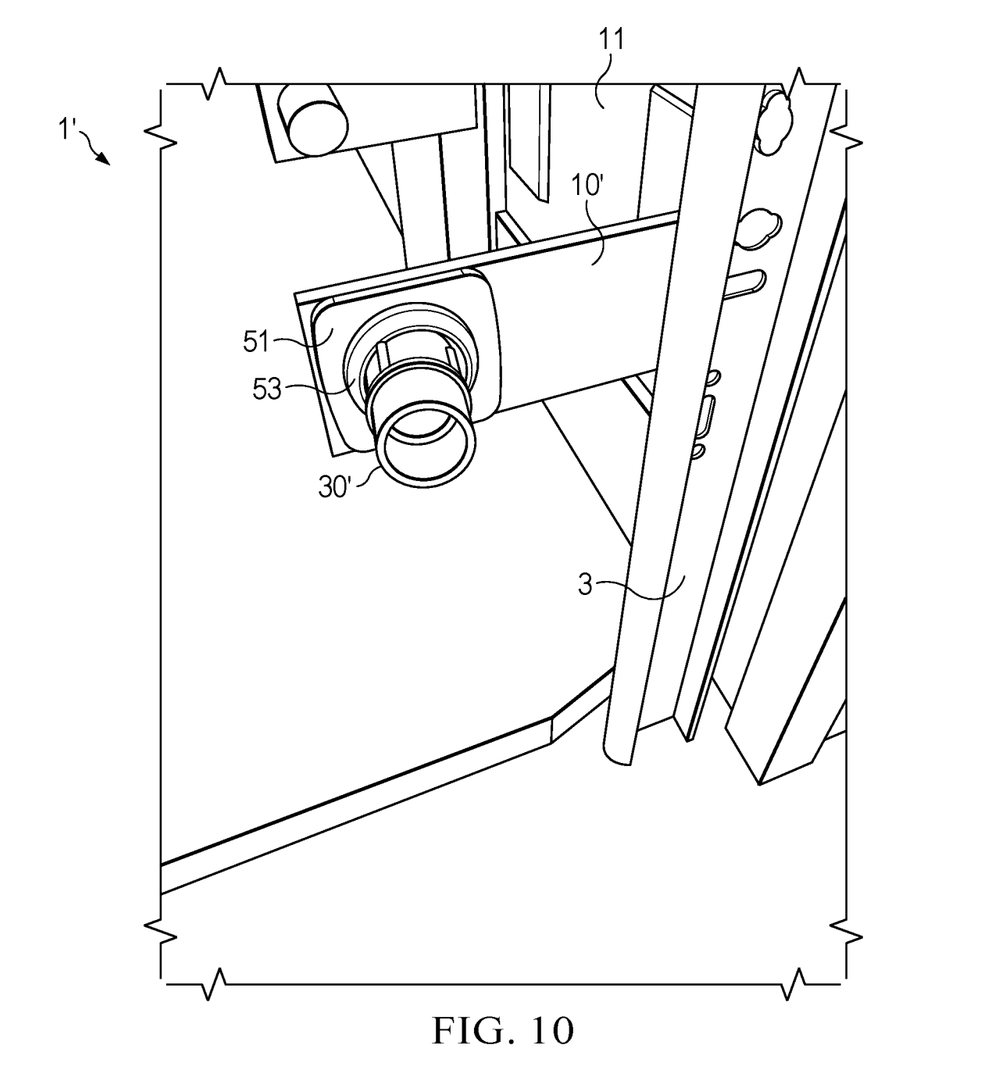
FIG. 10 is a front perspective view of the exemplary garage door sensor of FIG. 9 with an exemplary cover installed.

FIG. 9 and FIG. 10 illustrate another exemplary sensor unit 1'. The same or similar components may be numbered similarly but with the addition of a prime (e.g., 10 to 10'). The sensor unit 1' may comprise a same or different type of garage door sensor 50'. The garage door sensor 50' may be mounted to a frame 10'. The frame 10' may be configured for securement to a wall 11, a track 3 for a garage door 15, other frame member of the garage door assembly 9, combinations thereof, or the like. The garage door sensor 50' may be attached to the frame 10', such as by extending a portion of the garage door sensor 50' through a portion of the frame 10'.

The garage door sensor 50' may comprise a housing 51 for a sensor 50', such as a photo eye for example without limitation. The housing 51 may comprise a protrusion 53. The protrusion 53 may comprise a hollow cylindrical shape, though any size or shape protrusion 53, or multiple protrusions provided in a pattern or generally forming a shape, may be provided. The sensor 50' may extend a distance from the housing 51.

The sensor unit 1' may comprise a removable cover 30'. The cover 30' may comprise a hollow, cylindrical shape. However, other size or shape covers 30' may be utilized. The cover 30' may be configured to fit within a gap 55 between the protrusion 53 and the sensor 50'. The cover 30' may comprise a sidewall thickness configured to provide a friction fit between the protrusion 53 and the sensor 50' to removably secure said cover 30' therein. The sensor 50' may comprise a generally cylindrical shape and may be located in a same or different housing 51, though such is not required and the senor 50' may comprise any shape, type, or kind of sensor.

Figure 11:
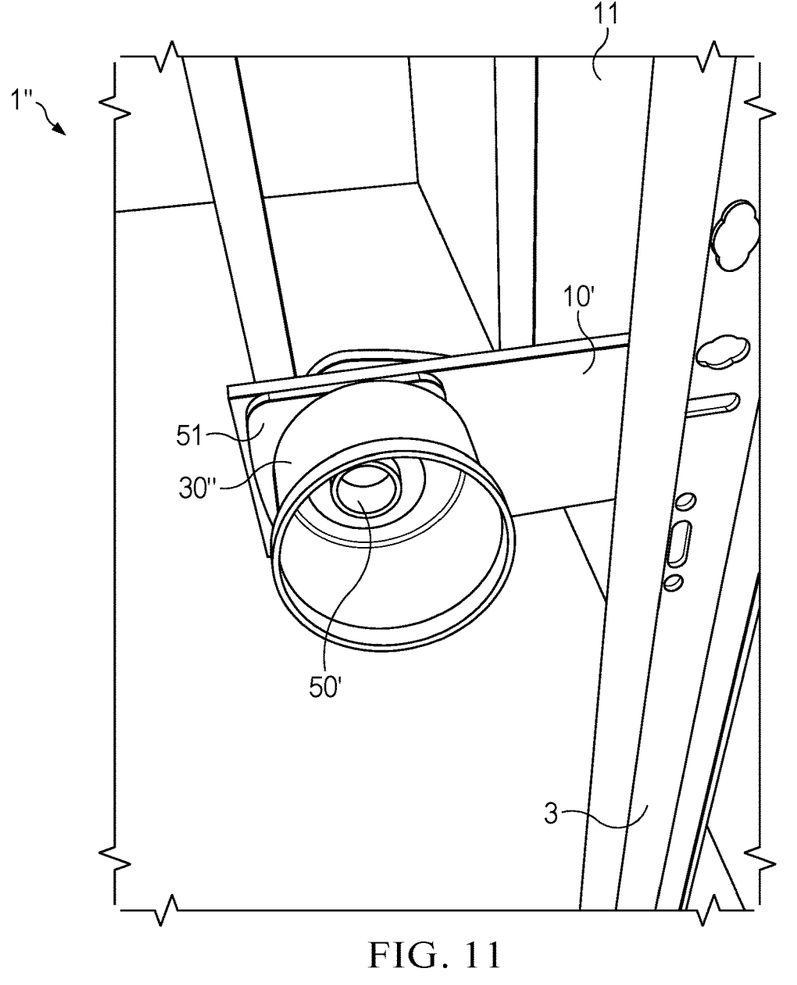
FIG. 11 is a front perspective view of the exemplary garage door sensor of FIG. 9 with another exemplary cover installed.
Figure 12:
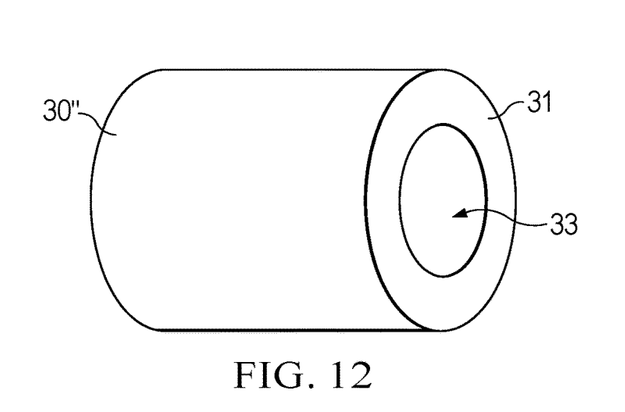
FIG. 12 is a rear perspective view of the exemplary cover of FIG. 11 shown in isolation.

FIG. 11 and FIG. 12 illustrates another exemplary sensor unit 1". The same or similar components may be numbered similarly but with the addition of one or two primes (e.g., 10 to 10' to 10"). The cover 30" may comprise a hollow cylindrical shape with a rear surface 31 located at a distal end thereof. However, other size or shape covers 30" may be utilized. The rear surface 31 may comprise an aperture 33 configured for placement between a surface of said sensor 50' and/or a front surface of said frame 10' and a rear surface of the protrusion 53. In this manner, the cover 30" may be secured frictionally within a gap between the rear surface of the protrusion 53 and a front surface of said frame 10' or a surface of said sensor 50'.

In any of the embodiments shown and/or described herein, the cover 30, 30', 30" may be removed from the associated garage door sensor 50, 50', 50" for cleaning of the garage door sensor 50, 50', 50". The cover 30, 30', 30" may be subsequently reinstalled. Where not needed, or no longer needed, the cover 30, 30', 30" may be permanently or temporarily removed, such as during evening hours, seasonally, depending on location or orientation of placement, direction the garage faces, combinations thereof, or the like. This may also permit the cover 30, 30', 30" to be periodically, such as upon breaking of the cover 30, 30', 30" or otherwise desired by a user.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A sensor unit comprising:
   a garage door sensor;
   a frame comprising an aperture and configured to be secured at one side of an opening for a garage door, wherein said garage door sensor is connectable to said frame;
   a cover comprising a slot and configured to accommodate at least a portion of said garage door sensor;
   a fastener configured to be secured to said garage door sensor, extended through said slot, and through said aperture; and
   a nut configured for securement to a portion of said fastener extending through said aperture so as to secure said cover and said garage door sensor to said frame in a removable fashion which also permits adjustment of said cover relative to said garage door sensor.

2. The sensor unit of claim 1 wherein:
   said slot extends to an outer edge of said cover.

3. The sensor unit of claim 2 wherein:
   said slot comprises a rear notch located proximal to the outer edge of said cover, where the rear notch has a larger width than a remainder of the slot; and said slot comprises a front notch located distal to the outer edge of said cover, where the front notch has a smaller width than a reminder of the slot.

4. The sensor unit of claim 1 further comprising:
one or more washers for placement along said fastener between said cover and said frame.

5. The sensor unit of claim 4 wherein:
the nut comprises a wing-nut.

6. The sensor unit of claim 1 wherein:
said garage door sensor comprises a receiving portion configured to receive a head of the fastener.

7. The sensor unit of claim 1 wherein:
said garage door sensor extends through a portion of said frame.

8. The sensor unit of claim 1 wherein:
said cover comprises a hollow cuboid shape.

9. The sensor unit of claim 1 wherein:
said cover comprises a hollow cylindrical shape.

10. The sensor unit of claim 1 wherein:
said frame is configured to be secured to a track for said garage door.

11. The sensor unit of claim 1 wherein:
said frame is configured to be secured to a wall adjacent to said garage door.

12. A sensor unit comprising:
a frame configured to be secured to a track or a wall at one side of an opening for a garage door;
a garage door sensor connected to said frame and comprising a housing and a sensor for detecting movement of objects within a detection range proximate said opening for said garage door;
a gap defined by at least a portion of said housing and at least a portion of said sensor; and
a cover sized to extend about and beyond said sensor to at least partially shade said sensor from sunlight during daylight hours, wherein said cover comprises a sidewall configured to provide a friction fit within said gap to removably secure said cover to said garage door sensor.

13. The sensor unit of claim 12 wherein:
said portion of said housing comprises a protrusion forming a hollow, cylindrical shape; and
said cover comprises a hollow, cylindrical shape.

14. The sensor unit of claim 13 wherein:
said cover comprises a rear surface comprising an aperture sized to accommodate at least a portion of said sensor.

15. A sensor unit comprising:
a garage door sensor;
a frame configured to be secured at one side of an opening for a garage door, wherein said garage door sensor is connectable to said frame;
a cover configured to accommodate at least a portion of said garage door sensor, wherein said cover is configured to be secured to said garage door sensor in a removable fashion;
a protrusion provided in a housing for said garage door sensor about a photo eye of said garage door sensor; and
a gap defined, at least in part by a rear surface of said protrusion and a front surface of said housing for said garage door sensor, wherein said cover comprises a hollow cylindrical shape comprising a rear surface having an aperture configured to accommodate said garage door sensor, and wherein said rear surface of said cover has a thickness configured to provide a friction fit within said gap.

16. A sensor unit comprising:
a garage door sensor;
a frame configured to be secured at one side of an opening for a garage door, wherein said garage door sensor is connectable to said frame;
a cover configured to accommodate at least a portion of said garage door sensor, wherein said cover is configured to be secured to said garage door sensor in a removable fashion;
a protrusion provided in a housing for said garage door sensor about a photo eye of said garage door sensor; and
a gap defined, at least in part by a rear surface of said protrusion and a front surface of said frame, wherein said cover comprises a hollow cylindrical shape comprising a rear surface having an aperture configured to accommodate said photo eye, and wherein said rear surface of said cover has a thickness configured to provide a friction fit within said gap.

* * * * *

UNITED STATES PATENT AND TRADEMARK OFFICE
CERTIFICATE OF CORRECTION

| | | |
|---|---|---|
| PATENT NO. | : 11,396,975 B2 | Page 1 of 1 |
| APPLICATION NO. | : 17/382690 | |
| DATED | : July 26, 2022 | |
| INVENTOR(S) | : Rick Hagel | |

It is certified that error appears in the above-identified patent and that said Letters Patent is hereby corrected as shown below:

On the Title Page

Page 2, item (56) References Cited, U.S. Patent Documents, Reference No. 2006/0196119, please delete "Hermann" and insert -- Hormann --.

Signed and Sealed this
Thirteenth Day of September, 2022

Katherine Kelly Vidal
*Director of the United States Patent and Trademark Office*